WILLIAM P. HORTON.
Improvement in Lock Nuts for Railway Joints.
No. 119,767. Patented Oct. 10, 1871.
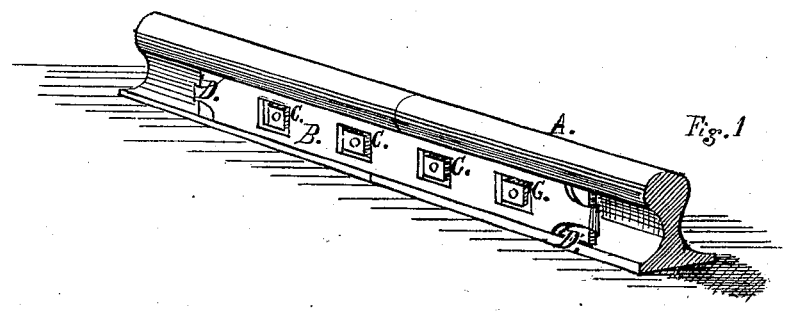
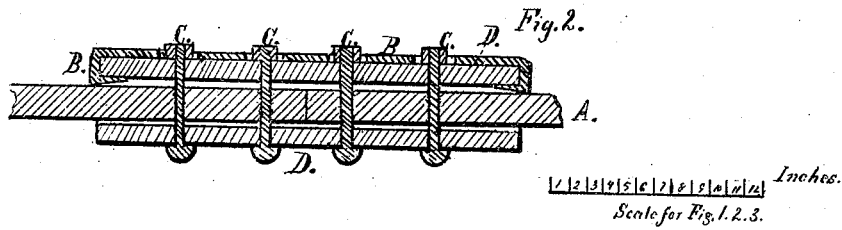
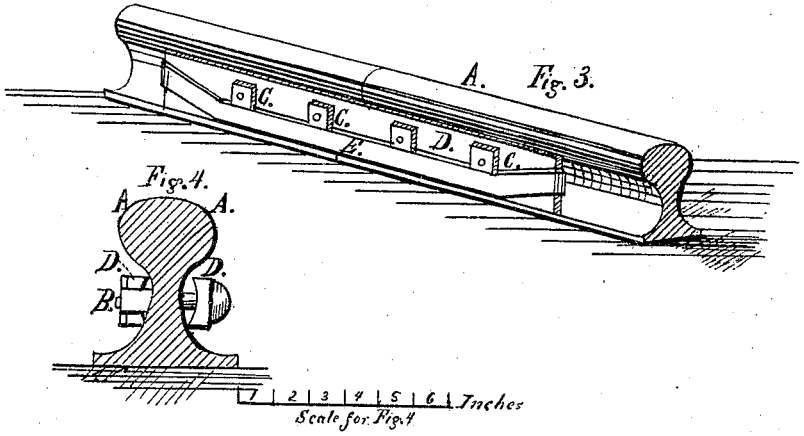
Witnesses.
Inventor.
William P. Horton

UNITED STATES PATENT OFFICE.

WILLIAM P. HORTON, OF MILWAUKEE, WISCONSIN, ASSIGNOR TO HIMSELF AND JOHN B. SMITH, OF SAME PLACE.

IMPROVEMENT IN LOCK-NUTS FOR RAILWAY JOINTS.

Specification forming part of Letters Patent No. 119,767, dated October 10, 1871.

*To all whom it may concern:*

Be it known that I, WILLIAM P. HORTON, of Milwaukee, in the county of Milwaukee, in the State of Wisconsin, have invented certain Improvements in Fastenings for Nuts in Railway Joints, of which the following is a specification:

My invention relates to the matter of fastening nuts from unscrewing, when screwed upon bolts or railway joints, by crooking the end of a bar lying alongside of the nuts and driving its ends under the fish-plate, or of cutting holes in a bar or metal plate and putting it on over the nuts, and crooking its ends and driving them under the fish-plate.

Figure 1, a view of a bar or plate with holes cut in it lying on over the nuts, and its ends driven under the ends of the fish-plate. Fig. 2 is a view of a bar lying alongside of the nuts on a fish-plate with its ends driven under the ends of the fish-plate; Fig. 3, an edgewise view of a fish-plate with a bar lying alongside of the nuts and the ends driven under the ends of the fish-plate; and Fig. 4, an end view of the bar, fish-plate, and rail.

A is the railway rail; B, bar or plate with holes in it for the nuts to come through, and lying over the nuts on the fish-plate, with its ends crooked and driven under the fish-plate; C, nuts and bolts which hold the fish plate up to the rail; D, fish-plates; E, bar which lays alongside of the nuts and hooks under the fish-plate.

This fastening is simple, strong, and effective. The ends hooking over the fish-plate hold the bar firmly in position and keep the nuts from turning. The end of the fish-plate being raised a little from the rail leaves an opening large enough for the ends of the bar to be driven under.

I claim—

The plate B or E, held in position by means of its ends turned inward and driven under the fish-bar, as described.

WILLIAM P. HORTON.

Witnesses:
J. B. SMITH,
A. H. LORD. (120)